April 9, 1929.  C. P. EISENHAUER  1,708,916
WATER SOFTENING APPARATUS
Original Filed Oct. 12, 1925    13 Sheets-Sheet 2
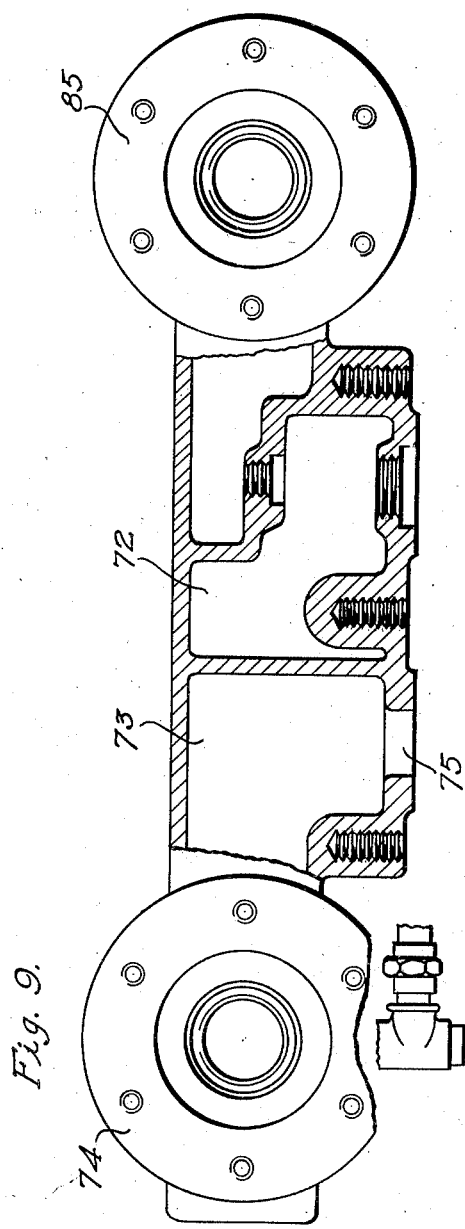
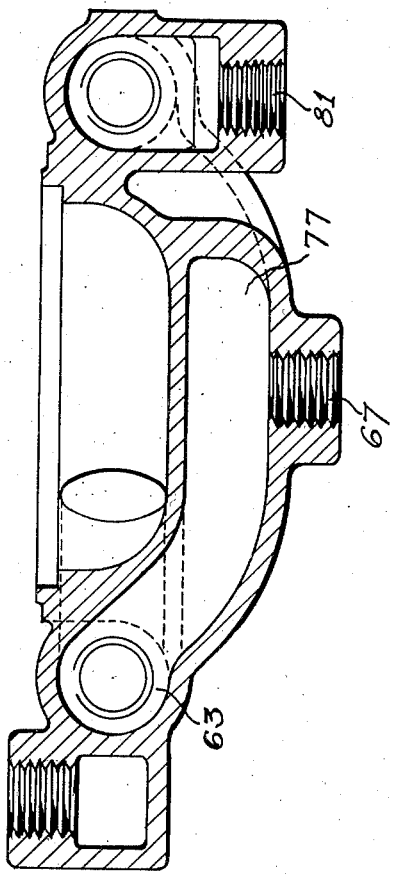
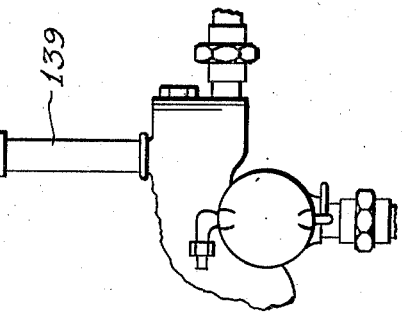
Inventor
CHARLES P. EISENHAUER,
By Toulmin Toulmin,
Attorneys

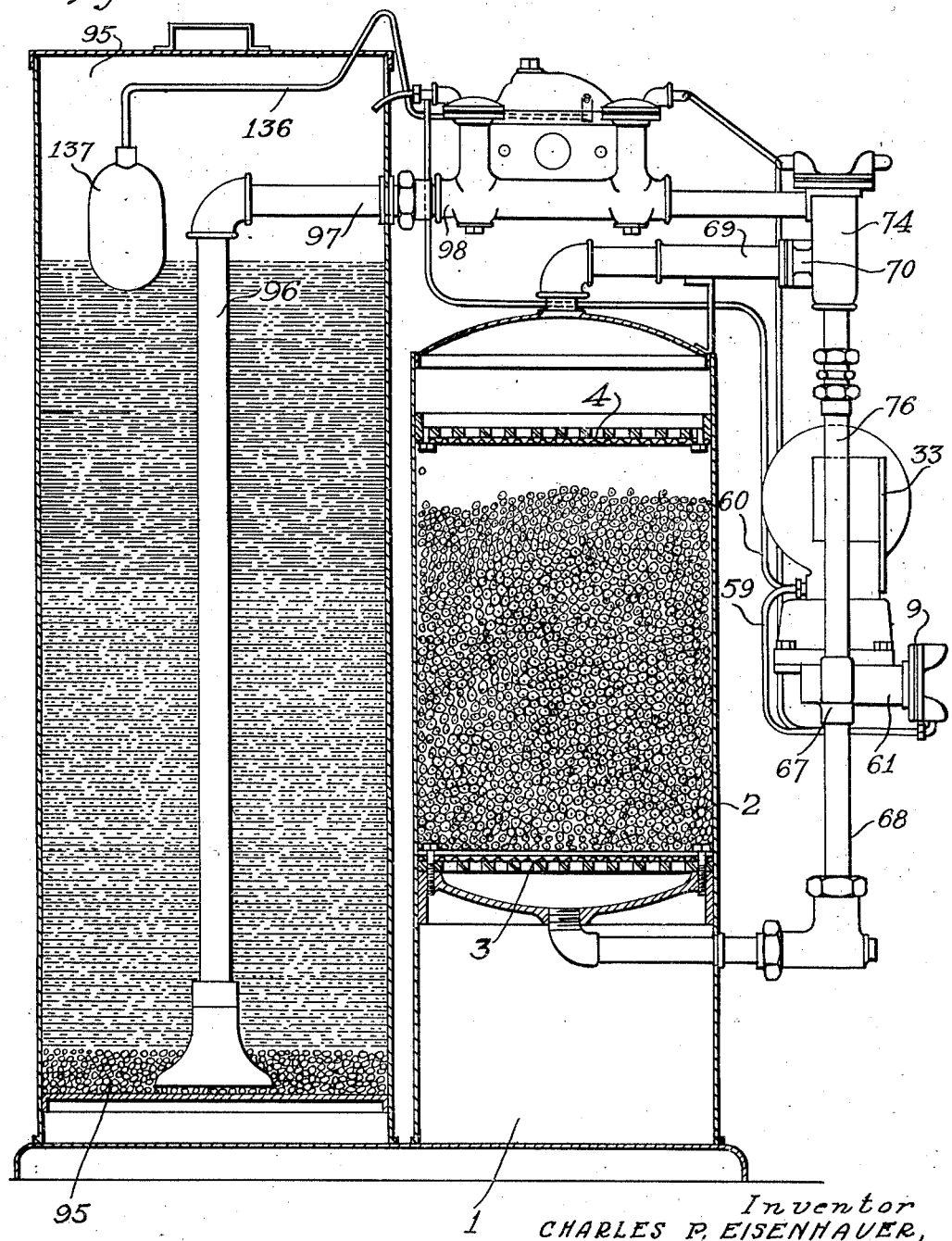

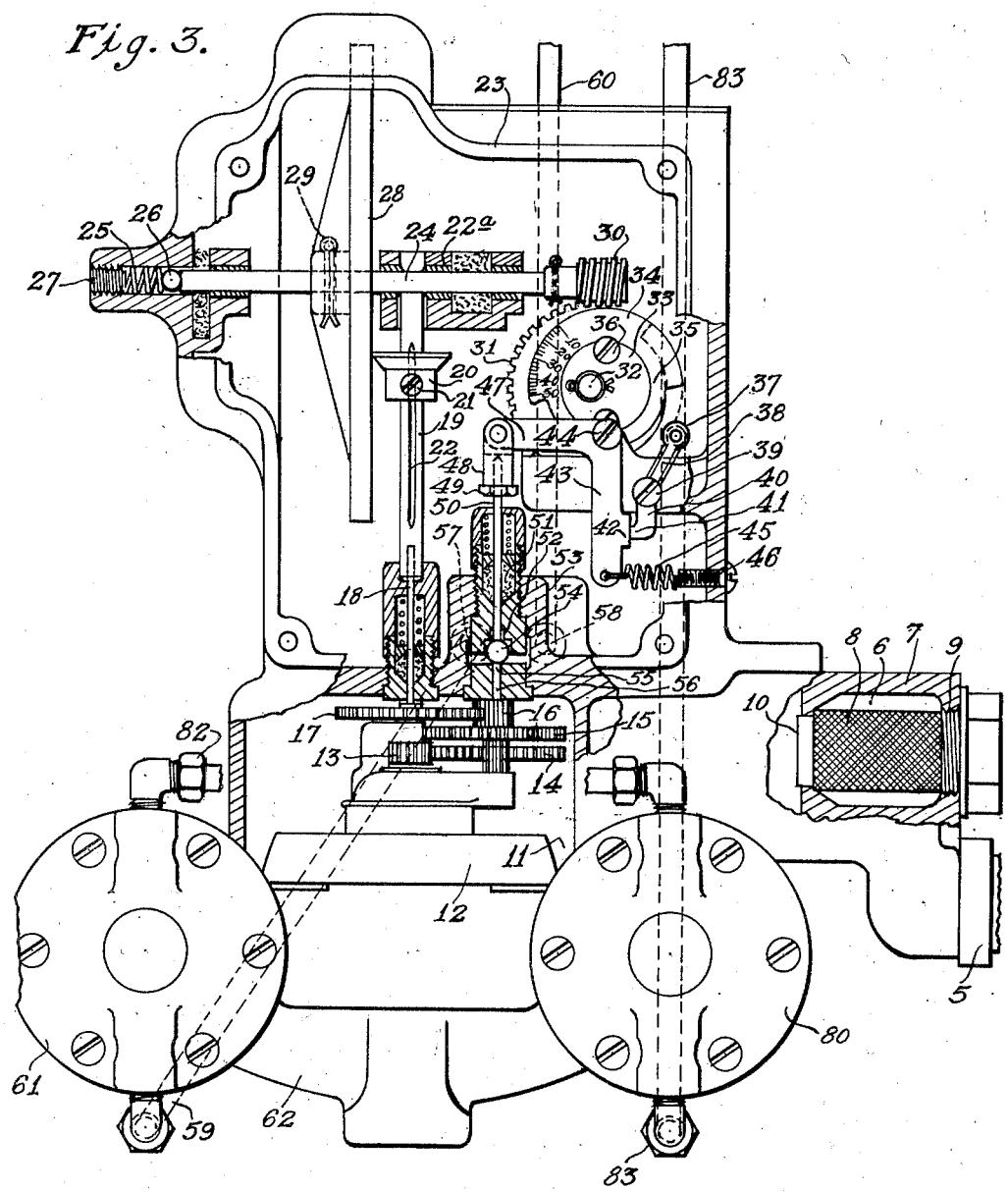

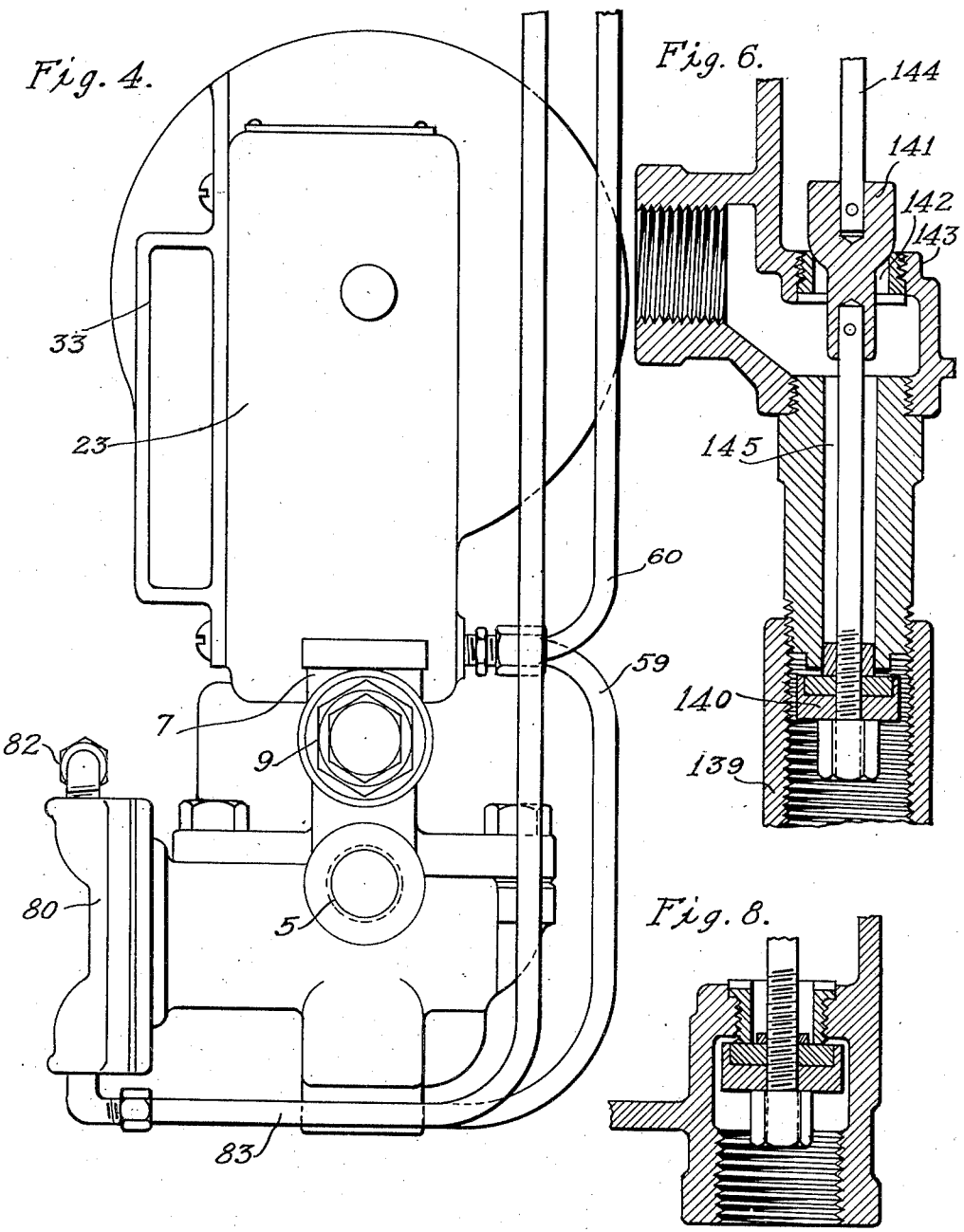

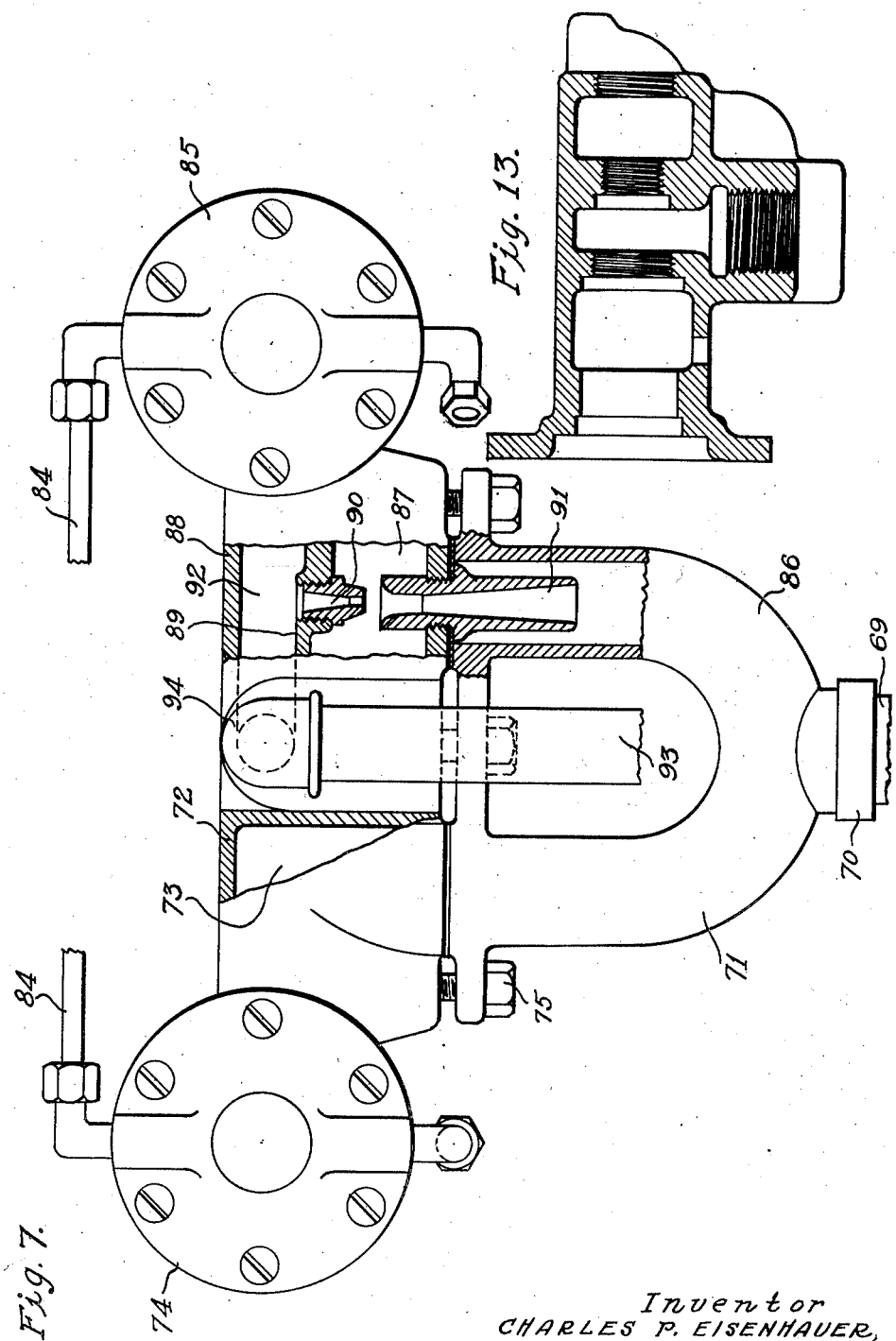

April 9, 1929.    C. P. EISENHAUER    1,708,916
WATER SOFTENING APPARATUS
Original Filed Oct. 12, 1925    13 Sheets-Sheet 7

Inventor
CHARLES P. EISENHAUER
By Toulmin & Toulmin,
Attorneys

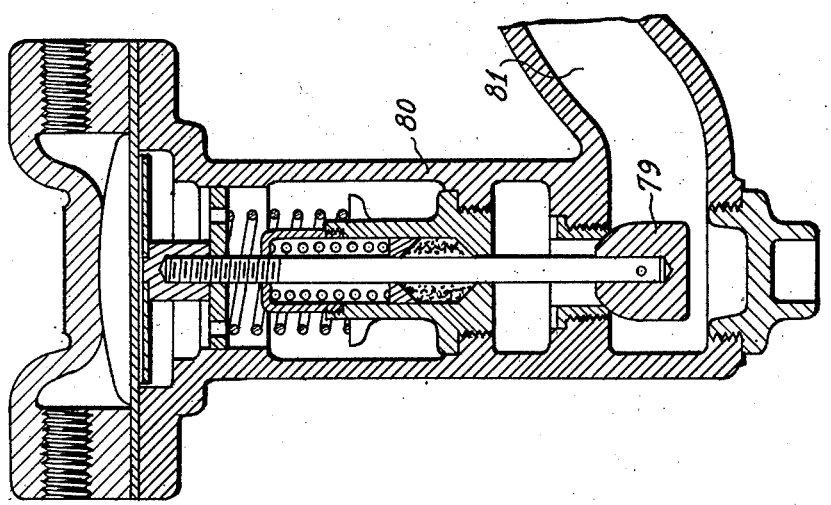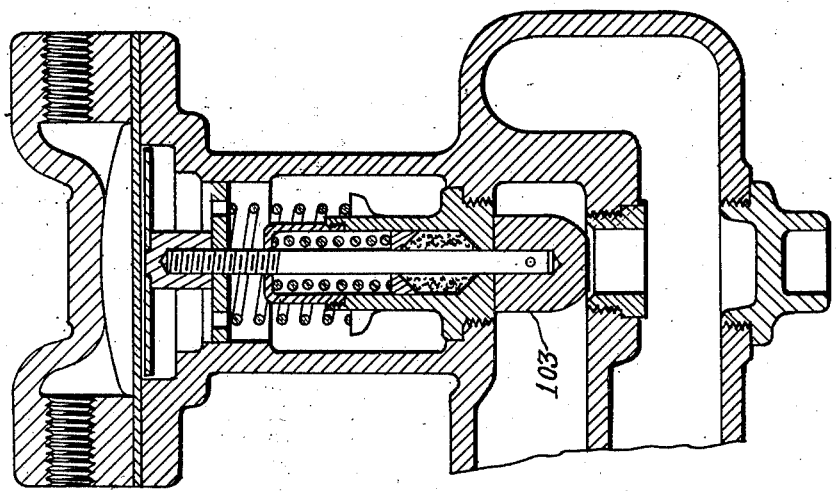

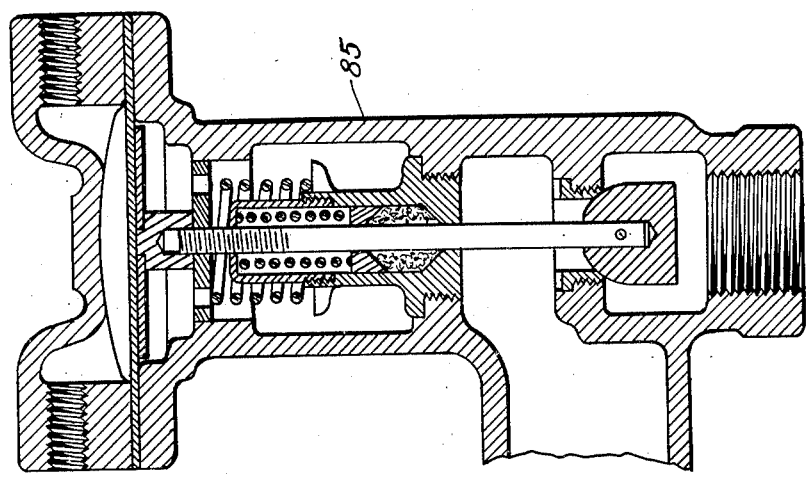
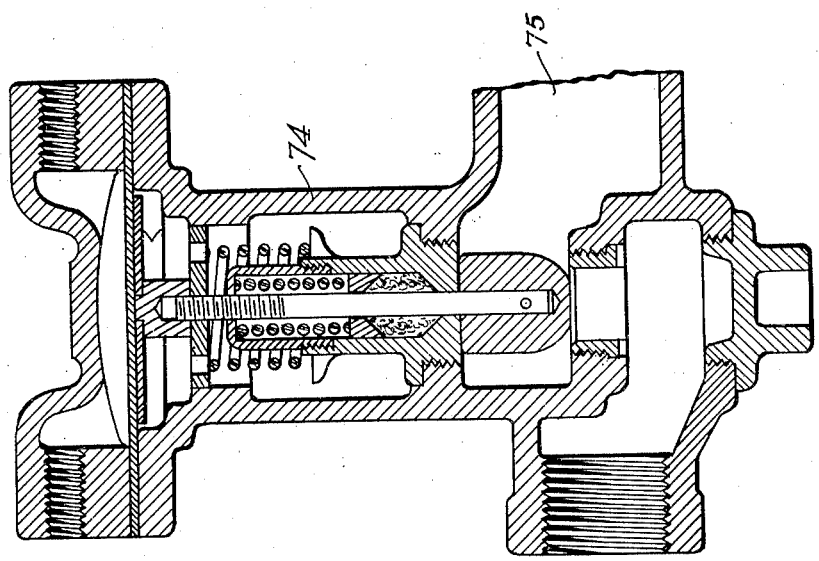

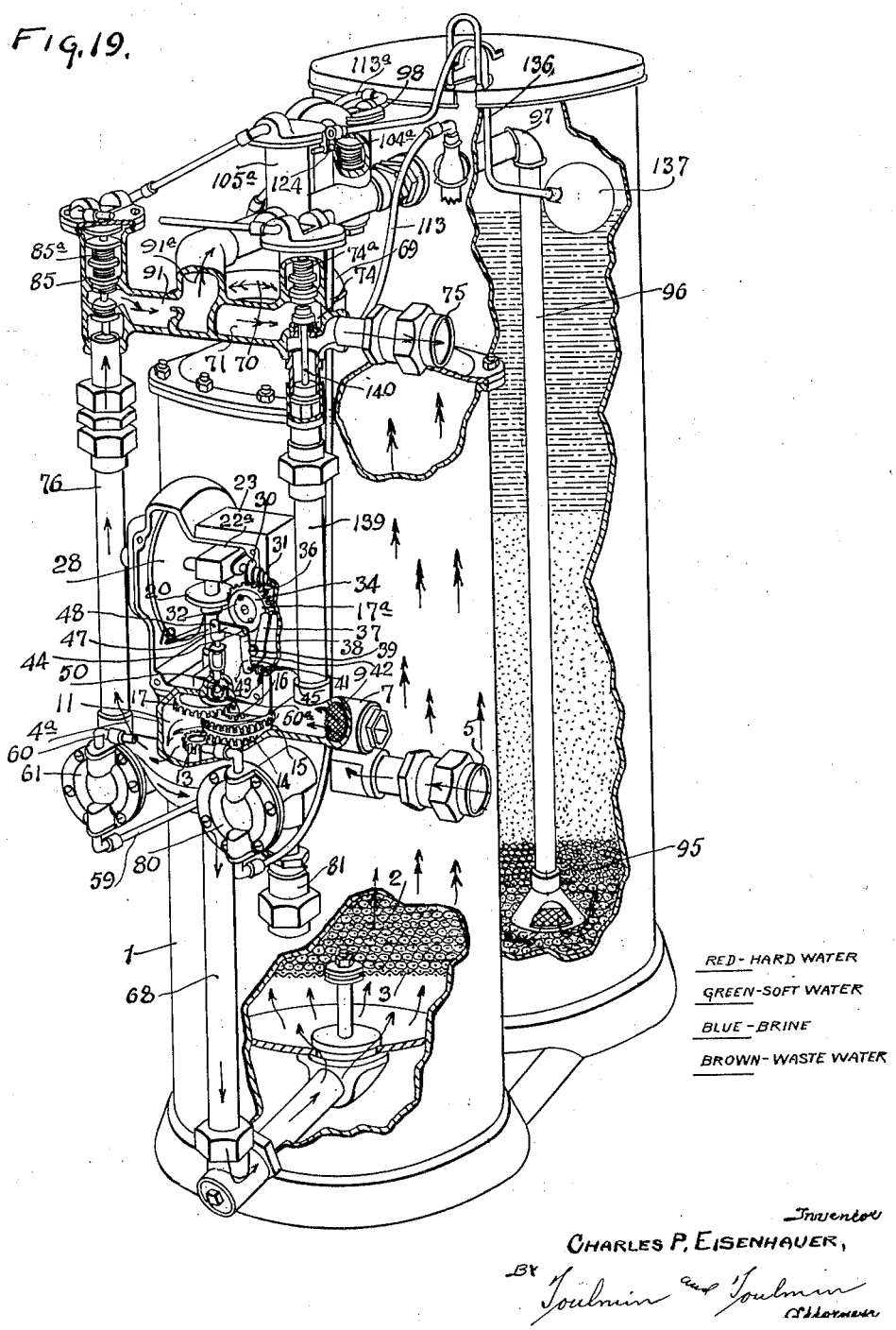

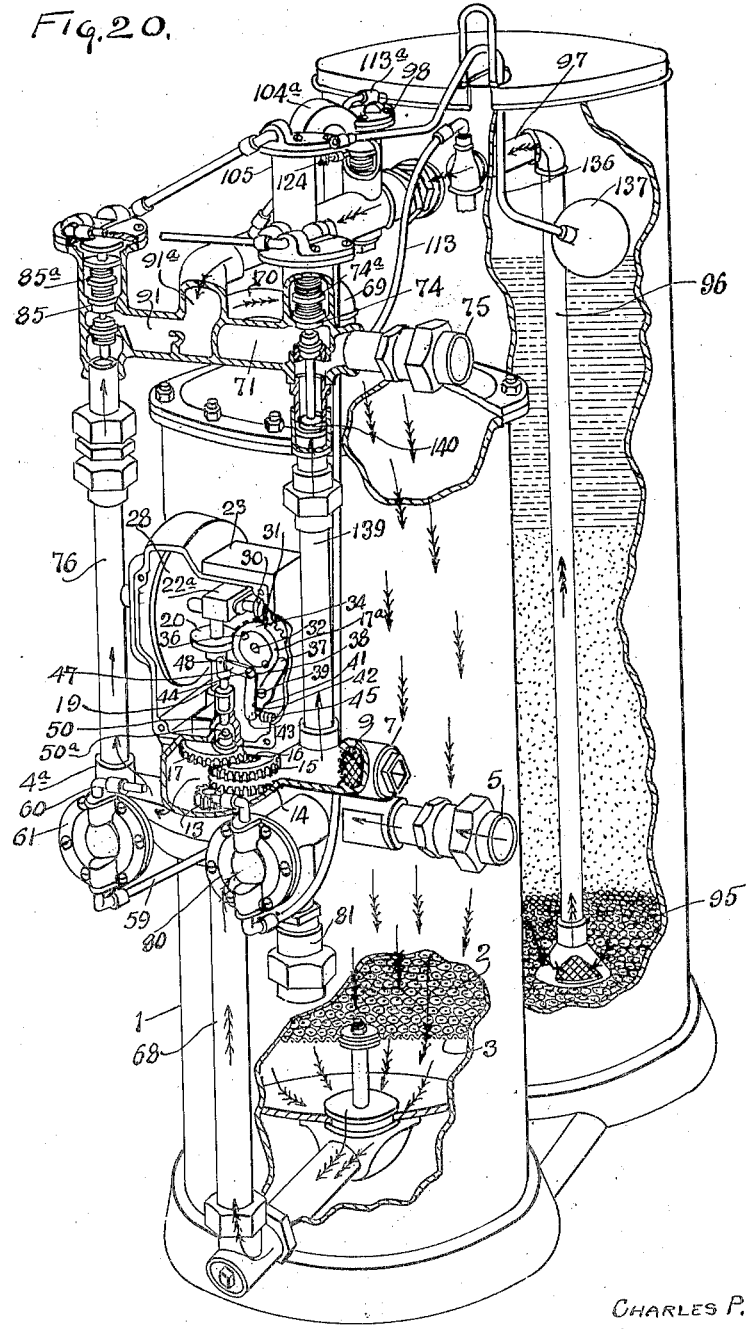

April 9, 1929.  C. P. EISENHAUER  1,708,916
WATER SOFTENING APPARATUS
Original Filed Oct. 12, 1925   13 Sheets-Sheet 12

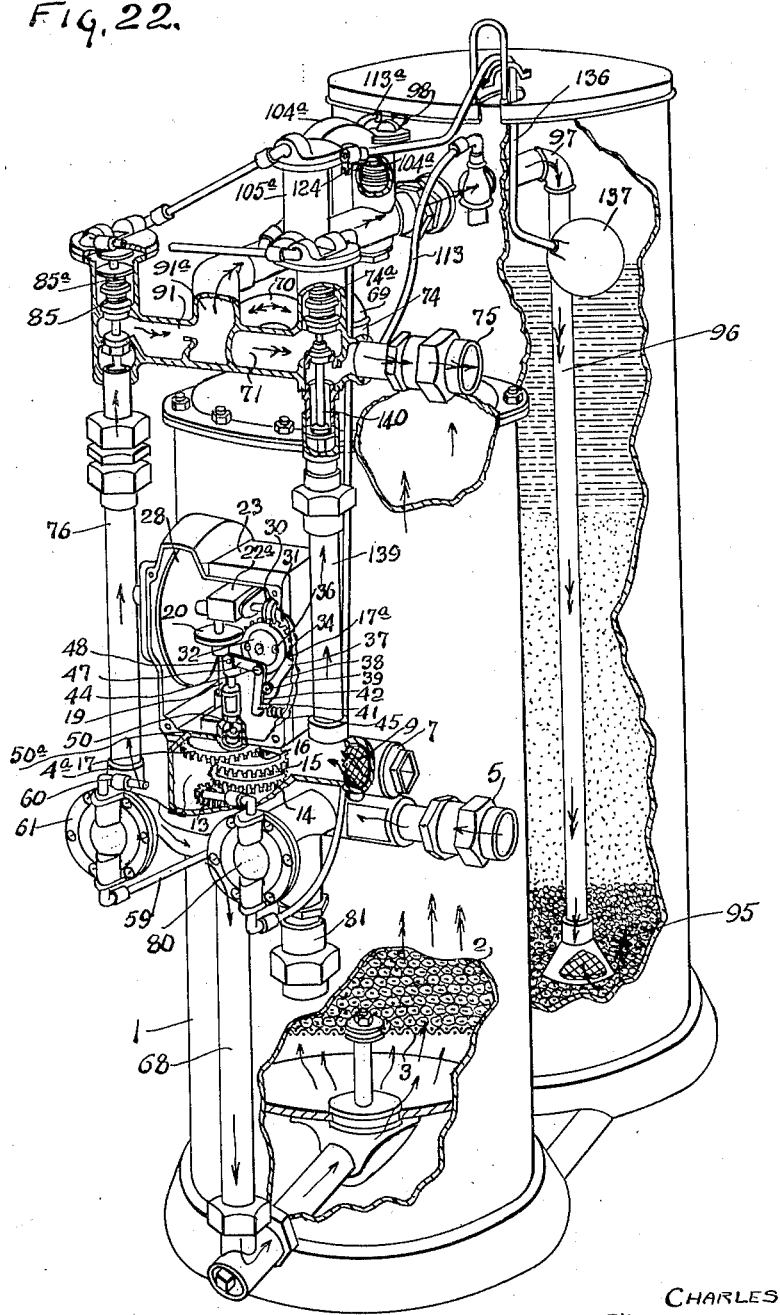

Patented Apr. 9, 1929.

1,708,916

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

WATER-SOFTENING APPARATUS.

Original application filed October 12, 1925, Serial No. 61,996. Divided and this application filed August 4, 1926. Serial No. 127,154.

My invention relates to water softeners and in particular to an automatic softener, and is a division of Ser. No. 61,996, filed Oct. 12, 1925.

It is the object of my invention to provide an automatic water softener, in which the periods of softening and regeneration are controlled by the amount of water passing through the system.

In particular, it is my object to provide an improvement upon my application, Serial No. 41,580, by providing certain assembly of the essential elements of the system in unit parts to facilitate operation and manufacture, and to produce improved results.

It is my object to provide a unit structure of the meter, softening and drain valves closely associated with the meter control mechanism, and to provide a unit for controlling the regeneration, including the refill valve and brine valve.

In the accompanying drawings:

Figure 1 is an elevation of the complete apparatus;

Figure 2 is a detail view of the arrangement of the drain valve, by-pass valve and hard water, by-pass line;

Figure 3 is a section through the meter casing and meter controlling mechanism casing showing the main needle valve control and attending apparatus;

Figure 4 is an end elevation thereof;

Figure 6 is a section through the by-pass valve mechanism;

Figure 7 is a plan view of the regeneration valve, house service valve, feed lines for brine and water, showing the injector mechanism in section;

Figure 8 is a section through the regeneration valve;

Figure 9 is a transverse section through the casing connecting the house service valve and regeneration valve;

Figure 10 is a section through the bottom of the meter casing on the line 10—10 of Figure 11;

Figure 13 is a section on the line 13—13 of Figure 11;

Figure 14 is a section through the by-pass valve mechanism;

Figure 15 is a section through the softening valve mechanism;

Figure 16 is a section through the drain valve mechanism;

Figure 17 is a section through the household service valve;

Figure 18 is a section through the regeneration valve;

Figure 19 is an elevation, partly in section, of the assembled softening apparatus, the structure being shown in "softening position."

Figure 20 is a view similar to Figure 19, showing the apparatus in first regenerating position.

Figure 22 shows a view similar to Figures 19, 20 and 21, the apparatus being in refill position.

Figure 5:
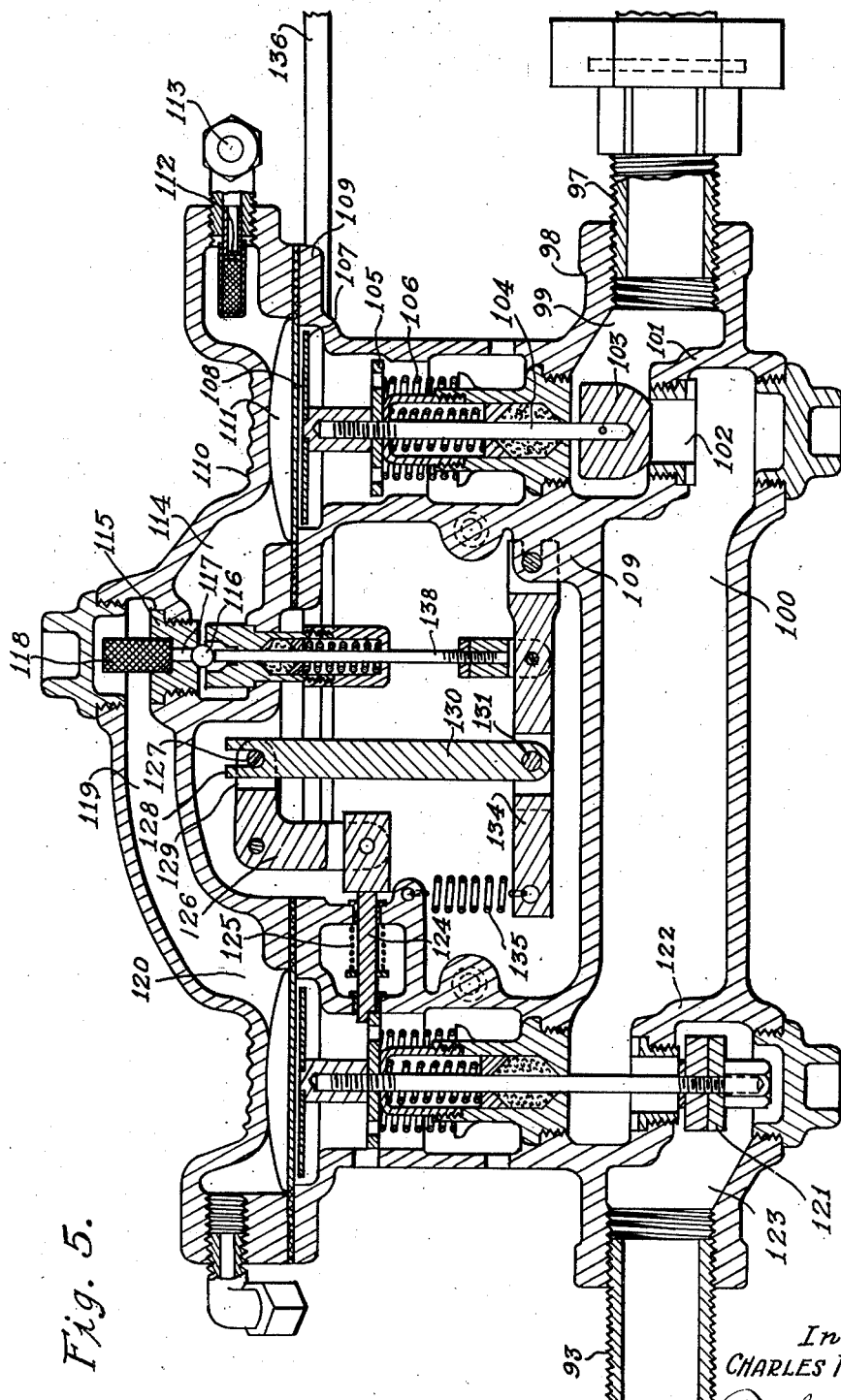
Figure 5 is a section through the unit, comprising a refill valve, brine valve, float arm and float for the brine tank.
Figure 11:
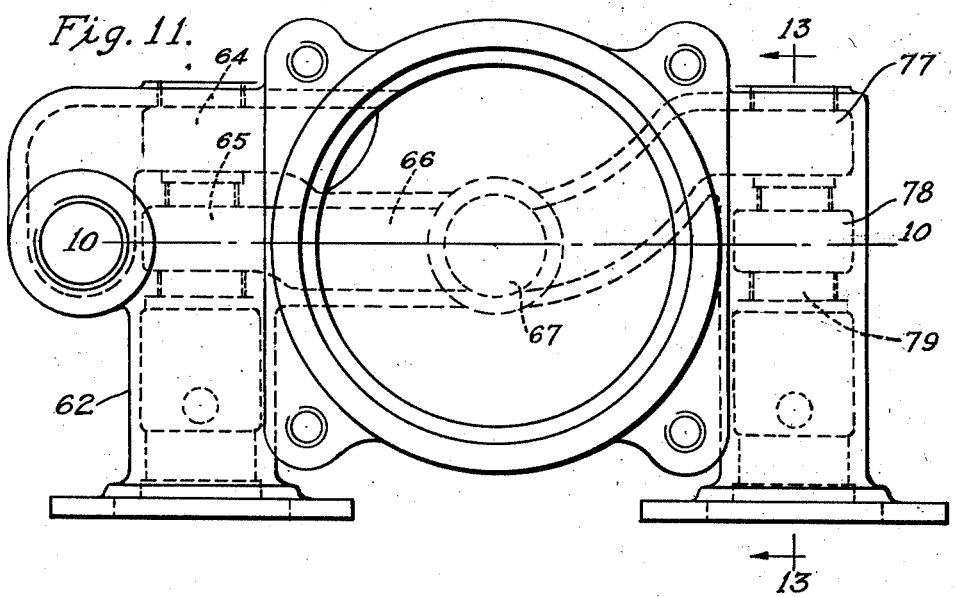
Figure 11 is a plan view of the meter casing.
Figure 12:
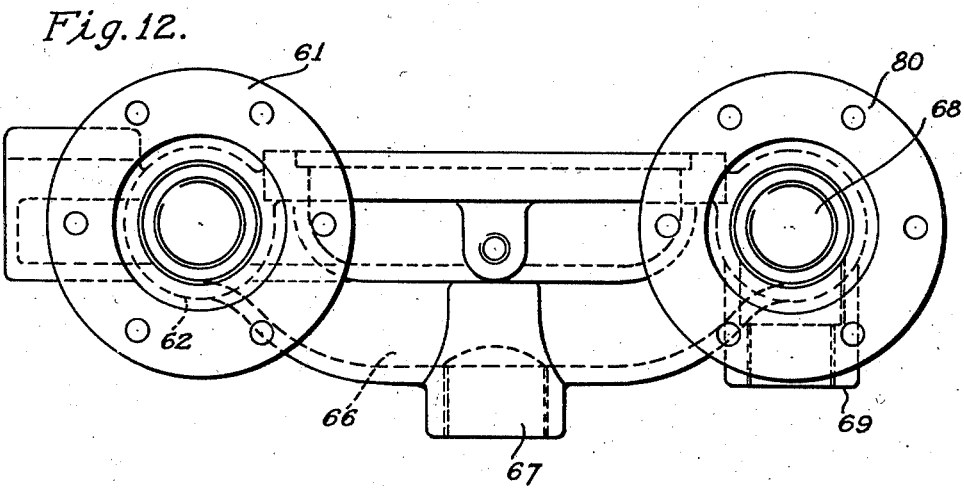
Figure 12 is a front elevation of the bottom of the meter casing.

Referring to the drawings in detail, in Figure 1 will be seen a tank 1 in which is located softening material 2 between the screens 3 and 4, the outlet and inlet lines being on the outside of the screens.

The hard water inlet line to the operating mechanism is designated 5. It passes upwardly into a chamber 6 in the casing bottom 7, where it passes through a screen 8 which is held in position by a screw plug 9 within the casing 7. The free end of the screen fits closely within a restricted mouth of this casing as at 10, so that the screen can be removed for cleaning, but all the water which passes into the system must pass through this screen.

The water passes into the meter chamber 11 where it operates the meter actuator 12 which, in turn, operates a train of gears 13, 14, 15, 16 and 17 in the usual manner. The last gear is mounted on a vertical shaft 18 which serves to drive a heavier shaft 19 carrying a driving friction member 20 which is adjustable thereon through a screw 21 working in a slot 22 in the shaft 19. The upper end of this shaft 19 is journalled in a bracket 22ª which is a part of the control mechanism housing 23. In this housing is journalled a shaft 24, one portion of which is supported in the bracket 22ª and the other portion of which is supported in a side wall of the casing 23. This shaft is spring pressed towards the right, in Figure 3, by a spring 25 pressing against a ball 26 which, in turn, presses against the end of the shaft 24. The tension on this spring is adjusted by the set screw 27.

On the mid portion of this shaft is a driven disk 28 held in the shaft by a cotter pin 29. This shaft 24 carries at its free end a worm 30 which engages with a worm wheel 31. This worm wheel is mounted on a shaft 32 on which is carried an eccentric disk 33. On this disk is a cam ring 34 which cooperates with another cam ring 35 carried on the shaft 32. By adjusting these cams by a set screw 36, the length of the high point of the two cams may be varied. This high point of the two cams may be varied. This high point of the two cams is adapted to engage with a cam follower or roller 37 carried on a bell crank consisting of an arm 38 pivoted at 39 on the casing 23 and an arm 40 which is provided with a head 41 adapted to ride against a head 42 of one arm of the bell crank 43 which is pivoted on this frame at 44. The free end of the arm 43 is connected to a spring 45, the other end of which is attached at 46 to the casing 23. The other arm of this bell crank is marked 47 and pivotally carries on its free end a link 48, at the end of which is adjustably locked and threaded by the nut 49, a needle valve stem 50. This stem passes through a spring pressed packing member 51 into a chamber 52 within the casing 53. On the end of this needle valve 50 is a needle ball 54 which is adapted to close the opening 55 of a passageway 56 leading from the meter chamber to the passageways 57 and 58 which respectively lead to the pipes 59 and 60 which are the pipes conveying liquid to the softening valve and to the brine overflow or bleed. A restricted bleed opening is provided in the line 60.

A line 59 leads to the softening valve 61 where it enters behind the diaphragm in that valve to operate the valve. This valve is located in one side of the bottom casing of the meter in the casting portion marked 62 which forms a tubular opening for the valve mechanism. The water in the meter casing passes outwardly through an opening marked 63 thence through a passageway 64 into a chamber 65 controlled by the softening valve, thence through a passageway 66 in the bottom of the meter casing and downwardly through the opening 67 to the pipe 68 which leads to the bottom of the casing 1, through the mineral where it is softened and out the pipe 69, thence to the mouth 70 of a U-shaped pipe, one branch of the U being 71 through which the water passes into the casing 72 into the chamber 73, thence past household service valve 74 to the household line 75.

During softening, the softening valve is normally open permitting the water to flow directly to the bottom of the tank while the passage of water to the top of the tank through the pipe 76 is prevented by the closing of the valve member in that line which is located at 65.

When the cams are turned through the meter control mechanism to a point where the high point is opposite the roller 37, the bell cranks will be actuated and the needle valve lifted so that pressure will be admitted into the pipe 59 behind the valve 61 closing it and seating it so that the chamber 65 will be closed from the supply in the line 64, with the result that the water will pass through the opening 63, the line 64 in the bottom casing of the meter and thence upwardly through the pipe 76 to the top of the tank, passing into the top of the tank through the pipe 69, downwardly through the tank 1 and outwardly through the bottom into the pipe 68 to the opening 67 in the bottom of the meter casing, whence it will pass to the right hand through the passageway 77 into the chamber 78 beneath the valve member 79 of the drain valve, generally designated 80. The water will pass out through the drain pipe 81 to waste.

The two valves 61 and 80 are connected together by a common line 82, so that the pressure admitted through the line 59 is conveyed through the pipe 82 to operate the drain valve 80. This same pressure is conveyed by the pipe 83 from the valve 80 to the service valve 74 which, in turn, is connected by the line 84 to the regenerating valve 85.

Turning to the application of the brine to the mineral, it will be understood that the water, when it flows during regeneration, passes upwardly through the regenerating valve 85 which is connected in the line 76, and thence through this valve into the line 69 and connected at 70 to the U-shaped pipe. The branch 86 of this U-shaped pipe is adapted to communicate with the chamber 87 of the casing 88 which is divided by a partition 89 through which is a restricted aperture 90 adjacent the injector 91 carried in a wall of the casing 88 and projecting into the pipe 86. The water passes into the chamber 92 formed in the casing 88 in one side of the partition 89, thence it passes through the restricted opening 90 into the injector 91, pipe 86 and the pipe 69. This draws brine through the pipe 93 through the elbow 94 into the chamber 92, through the opening 90, injector 91, pipe 86 pipe 69 to the top of the softening tank, whence it passes through the softening material, out the bottom of the tank, through the drain valve to drain.

In order to supply this brine at the proper interval, it will be observed that there is a brine tank designated 95. This brine tank is provided with a pipe 96 which leads from the bottom of the tank to the top and out the top thereof, through a pipe 97 into an integral casing containing the brine valve, refill valve and associated control mechanism.

The pipe 97 leads into a casing 98 in which there is a chamber 99 separated from a tubular chamber 100 by a partition 101 which is provided with an aperture 102 surrounded by a valve seat 102 adapted to be closed by a valve member 103 carried on a valve stem 104. This is the brine valve shown generally at 104$^a$. This valve stem carries on its upper end a shoulder 105 against which abuts a spring 106 to move the valve in one direction and a broad plate or head 107. This plate is adapted to engage with a rubber diaphragm member 108 held between the upper part of the casing 109 and the cap casing 110. Between this diaphragm 108 and the cap casing 110 is a diaphragm chamber 111, one end of which is adapted to discharge its contents through a bleed valve 112 to the drain pipe 113, and the other end of which is adapted to receive its contents through the chamber 114 which communicates with a passageway 115 controlled by a ball valve 116 which is adapted to close or open the passage way 117 through the screen 118 to the passageway 119 whence comes the pressure from the diaphragm chamber 120 over the refill valve which, in turn, is supplied with pressure from the pipe 83.

The refill valve 105$^a$ has a construction similar to that of the brine valve with similar parts indicated with similar numbers. The only difference is that the refill valve carries its valve member 121 beneath a partition 122 to separate the contents of the passageway 100 from the passageway 123, which, in turn, communicates with the pipe designated 93. In addition to this, the refill valve is adapted to be locked open by the locking plunger 124 which is spring pressed in one direction by the spring 125 and is moved in the other direction by a bell crank 126 pivoted to one end of the plunger 124 and connected at the other end by a pin 127 working in a slot 128 of jaws 129 of a link 130, which link is carried pivotally at 131 by a lever 134 supported at one end by a spring 135 and at its other end, is pivotally mounted on the casing 109. This bell crank 126 is connected to the float arm 136 carrying a float 137 so that as the float rises and falls, the plunger will be moved inwardly and outwardly and the bell crank will be actuated.

Mounted on the lever 134 is a valve stem 138 controlling the ball 116 which controls the application of pressure to the diaphragm 108 and thereby controls the actuation of the valve member 103.

During the period of regeneration, it is necessary to deliver water to the house and to accomplish this. I provide means of conveying hard water directly to the house line by by-passing a portion of the hard water through the line 139 past the by-pass valve 140 which is open permitting the passage of fluid directly to the household line 75. In order to prevent this water from passing into the system, the system is sealed off from this by-pass line by the valve member 141, which is adapted to close the opening 142 in the partition 143. This valve 141 is controlled by a valve stem 144. These valve members 140 and 141 are connected by a valve stem 145. The valve stem 144, in turn, is controlled by the valve mechanism of the refill valve generally designated 146.

Method of operation.

It will be understood that in operating this device, the water passes into the meter and having turned the cams to the desired position, the needle valve is open. At this moment, the system is in softening position in which the drain valve is closed, the softening valve is open, the refill valve is closed, the by-pass valve is closed and the brine valve is open.

As soon as the pressure is applied to the needle valve, the softening valve is closed, the drain valve is open, the by-pass valve is open, the refill valve is open and locked open and the brine valve remains open.

The passage of water through the injector draws brine from the brine tank through the line 97, passageway 99, passageway 100, passageway 123 and line 93 to the top of the tank, where it passes through the tank and regenerating material. This continues until the float 137 drops down, due to the exhaustion of water or brine in the brine tank. This results in the movement of the bell crank 126 to a point where the pin 127 depresses the link 130 and the lever 134 opening the ball valve 116, allowing the hydrostatic pressure to operate the diaphragm 108 and thereby close the brine valve shutting off further brine.

In the meanwhile, the water is still continuing to pass in the top of the tank and and out through the drain to wash the salt out of the tank, and this continues until the cycle of operation is complete, that is, until the cam follower or roller drops down off of the high point of the cam allowing the needle valve to close. The draining of the water from behind the valves into the salt tank serves to replenish that tank with additional water to bring it up the level required.

In addition to this, after the softening starts, the water will by-pass back to a certain extent through the salt line to replenish the salt tank, as the brine valve is now open and the refill valve is still locked open. This continues until the float rises to a point below the locking plunger 124 allowing the refill valve to close.

Figure 19 represents the device in softening position. The water to be softened enters the softener at the inlet 5, passes through the strainer screen 9, into meter chamber 11, through the meter to the junction point 4ª, and upward to regeneration valve 85, which is closed and stops the water. The softening valve 61, which is open, allows the water from the junction point 4ª to pass to the drain valve 80, which is closed. The water therefore passes through the pipe to the bottom of the softener and thence through the distributor, gravel, mineral and upper screen, which screen prevents the mineral from coming out.

After the water passes through the screen at the top it enters the manifold 70, passes through the ejector 91 to refill valve 105ª, which is closed stopping the water. It also flows through the manifold to service valve 74, which is open allowing the water to pass through to the house service. The hard water coming up through the bottom screen in the softener and up through the by-pass line 139 is stopped below the service valve by the by-pass valve 140.

As the water passes through the meter it causes the shaft 19 to rotate in proportion to the amount of the water used. This shaft has a driving wheel 20, which can be adjusted for various hardnesses of water, and which drives the disc 28, which in turn causes the cam 34 to rotate. When the raise 17ª on the cam 34 reaches a point where it pushes the lever 37 it causes the softener to regenerate, as shown in Figure 20.

Figure 20 shows the first position of regeneration. When the cam 34 pushes the lever 38 it opens the needle valve 50, allowing the water pressure to enter the chamber 50ª, from which it passes back into the tube line 59, thence into the diaphragm of the softening valve 61, drain valve 80, service valve 74, regenerating valve 85 and refill valve 105ª, closing the softening valve 61 and service valve 74, as shown, and opening the drain valve 80, regenerating valve 85 and refill valve 105ª, also a by-pass valve 140 at the bottom of the service valve 74, which permits water to pass through the by-pass to the house lines while the softener is regenerating. After the valves have shifted, the water from junction point 4ª passes through regeneration valve 85, through the ejector 91, causing a vacuum in the chamber 91ª, causing the brine to flow into chamber 91ª, where it is carried by the velocity of the water through the ejector throat into the softening tank down through the mineral and out at the bottom, up to the drain valve 80 and out into the sewer.

When the brine lowers in the brine tank to a predetermined level the float 137 lowers with it and causes the plunger 124 in the brine valve 104ª to pull out, releasing the valve stem and permitting the spring to close it, shutting off the brine.

The brine valve 104ª when in softening position is held open by the pressure, but when the softener is thrown into the regenerating position a vacuum is created above the diaphragm through the tube line 113ª instead of pressure, which permits the brine valve 104ª to close, but the plunger 124 holds it open until the float pulls the plunger out, allowing it to close.

Figure 21:
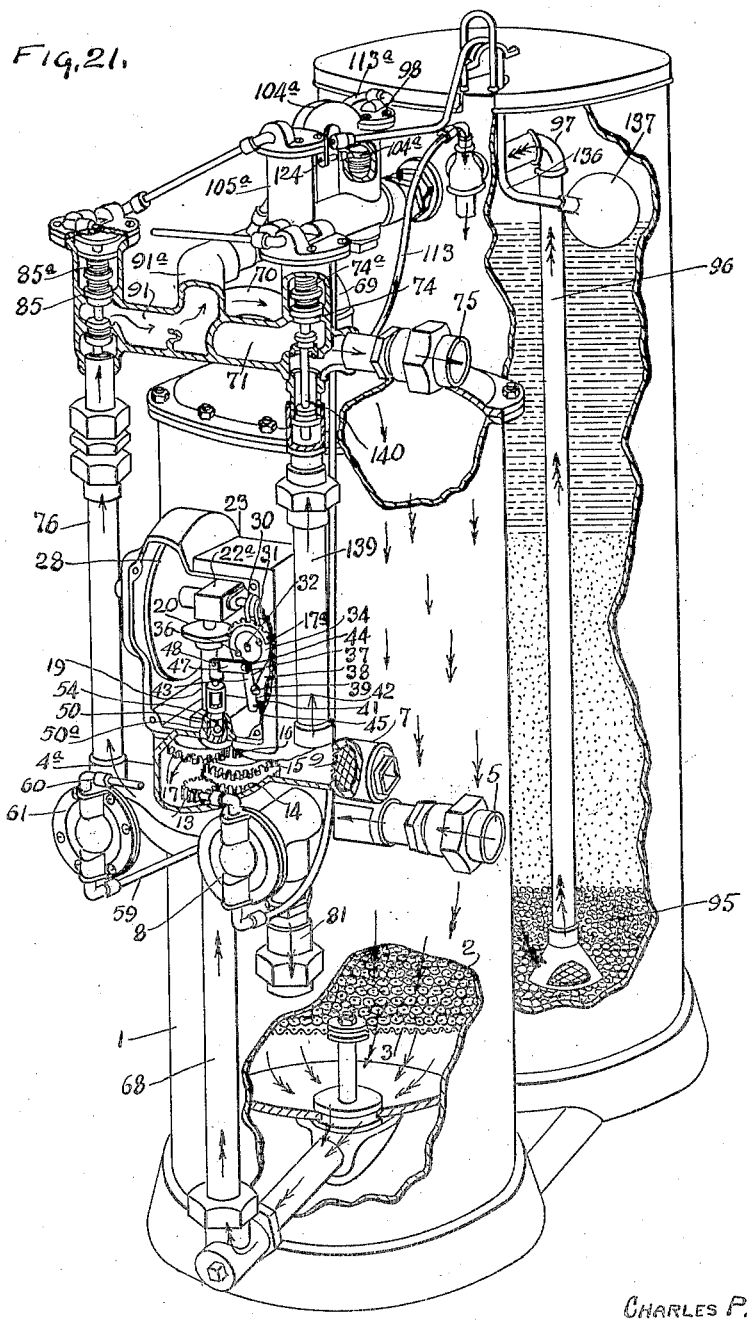
Figure 21 is a view similar to Figures 19 and 20, showing the apparatus in second regenerating position.

Figure 21 represents the apparatus in the second regenerating position. After regeneration is started, as shown in Figure 20, and the brine is cut off by the float 137, water continues to flow through the ejector 91, down through the softener and out to the waste until the regenerating action is complete and no brine is left in the softener. At this point the cam 34 has moved around where the lever 38 falls off the cam, allowing the needle valve to close, shutting off the water pressure from the meter chamber to chamber 50ª, to which the tube line is connected that leads to the diaphragm, and of course the pressure is shut off on this tube line. The pressure is then released in the tube lines by a bleed in the back of the meter housing connected to the chamber 50ª and leads to the brine overflow 113, then to the waste.

Upon the release of the pressure all of the valves return to their original position by means of the pressure of the springs 74ª and 85ª, except as shown in Figure 22.

Figure 22 shows the refill position. After the pressure on the valves is released, the springs return all of the valves to their original position except the refill valve 105ª, which is locked open by the plunger 124. The brine valve is now opened again by the pressure on the diaphragm through the tube 113ª, and since the refill valve 105ª is locked open, water flows in the regular softening course, as shown in Figure 19, and also back through the ejector 91 into the brine tank, refilling it to a point where the float 137 rises and releases the plunger 124, when the softener is again ready to deliver soft water.

Any grade of salt, provided it is pure and clean, is satisfactory for use in this apparatus.

It will be understood that I desire to comprehend within my invention such modifications as may be necessary to adapt it to varying conditions and uses.

Having thus fully described my invention, what I claim as new and desire to secure by Letters Patent, is:

1. In a water softener having a container for brine and a container for softening material, mechanism for interconnecting said containers comprising a casing divided into first and second compartments, a U-shaped pipe open at its ends and at the bottom thereof, and communicating with the respective compartments, means of delivering liquid to said first compartment, a partition in said second compartment, means of delivering brine into said second compartment to one side of said partition, means of delivering fresh water into said second compartment on the other side of said partition, said partition having a restricted opening, and injector mechanism carried by said casing and communicating with the second compartment on one side of the partition and the adjacent open end of the U-shaped pipe.

2. In a water softener having a container for brine and a container for softening material, mechanism for interconnecting said containers comprising a casing divided into first and second compartments, a U-shaped pipe open at its ends and at the bottom thereof, and communicating with the respective compartments, means of delivering liquid to said first compartment, a partition in said second compartment, means of delivering brine into said second compartment to one side of said partition, means of delivering fresh water into said second compartment on the other side of said partition, said partition having a restricted opening, injector mechanism carried by said casing and communicating with the second compartment on one side of the partition and the adjacent open end of the U-shaped pipe, and valve mechanism for controlling the admission of fluid into the respective compartments of said casing.

3. In a water softener having a container for brine and a container for softening material, mechanism for interconnecting said containers comprising a casing divided into first and second compartments, a U-shaped pipe open at its ends and at the bottom thereof, and communicating with the respective compartments, means of delivering liquid to said first compartment, a partition in said second compartment, means of delivering brine into said second compartment to one side of said partition, means of delivering fresh water into said second compartment on the other side of said partition, said partition having a restricted opening, injector mechanism carried by said casing and communicating with the second compartment on one side of the partition and the adjacent open end of the U-shaped pipe, and valve mechanism for controlling the admission of fluid into the respective compartments of said casing, said valve mechanism being hydrostatically operated and being moved in one direction by yielding means.

4. In a water softening apparatus having a container for brine and a container for softening material, means for connecting said containers comprising a casing, bifurcated means attached to said casing, one side of which is unrestricted and the other side of which has interposed therein injector mechanism, a brine line connected to the injector mechanism and separate means for controlling the fluid passing through the respective sides of the bifurcated means.

5. In combination, a casing divided into two compartments, the second of said compartments being sub-divided into two compartments, a U-shaped pipe detachably connected to said compartments first mentioned, said pipe having an opening at the base of the U, means of admitting fluid into said compartment, a second pipe communicating with the second of said compartments in one of its halves, injector mechanism located in said compartments and projecting into one part of the U-shaped pipe, and valves adapted to control the passage of fluid through the compartments and pipes.

6. In a water softening apparatus, a unit refill valve and brine valve mechanism consisting of a refill valve, a brine valve, a brine and refill line, a hydrostatic pressure line, a needle valve interposed between said valves in the hydrostatic pressure line, a line for supplying hydrostatic pressure thereto, a line for exhausting hydrostatic pressure therefrom, said valves being adapted to move in one direction by the hydrostatic pressure and in the other direction by yielding means, means to lock said refill valve open, a float and float arm adapted to unlock said refill valve and adapted to actuate said needle valve to open it.

7. In a water softening apparatus, a unit refill valve and brine valve mechanism consisting of a refill valve, a brine valve, a brine and refill line, a hydrostatic pressure line, a needle valve interposed between said valves in the hydrostatic pressure line, a line for supplying hydrostatic pressure thereto, a line for exhausting hydrostatic pressure therefrom, said valves being adapted to move in one direction by the hydrostatic pressure and in the other direction by yielding means, means to lock said refill valve open, a float and float arm adapted to unlock said refill valve and adapted to actuate said needle valve to open it, said hydrostatic pressure line communicating with hydrostatic chambers, the bottoms of which are formed by diaphragms for actuating said valves.

8. In a water softening apparatus, a unit refill valve and brine valve mechanism consisting of a refill valve, a brine valve, a brine and refill line, a hydrostatic pressure line, a needle valve interposed between said valves in the hydrostatic pressure line, a line for supplying hydrostatic pressure thereto, a line for exhausting hydrostatic pressure therefrom, said valves being adapted to move in one direction by the hydrostatic pressure and in the other direction by yielding means, means to lock said refill valve open, a float and float arm adapted to unlock said refill valve and adapted to actuate said needle valve to open it, said hydrostatic pressure line communicating with hydrostatic chambers, the bottoms of which are formed by diaphragms for actuating said valves, said refill valve being adapted to close from the bottom upwardly and the brine valve to close from the top downwardly.

9. In combination in a refill valve and brine valve, of a common passageway for the passage of brine and refill water, partitions therein, valve members adapted to close the openings in said partitions, said members belonging respectively to the refill and brine valves, yielding means to actuate said valve members, diaphragms associated with said valve members adapted to be actuated by the hydrostatic means, a passageway for hydrostatic fluid communicating with said diaphragms, a needle valve interposed between said diaphragms in said passageway, a float and float arm, a bell crank actuated thereby, a link and lever loosely connected thereto adapted to be actuated by said float and float arm when it reaches a predetermined low point, whereby the needle valve connected to said lever is actuated.

10. In combination in a refill valve and brine valve, of a common passageway for the passage of brine and refill water, partitions therein, valve members adapted to close the openings in said partitions, said members belonging respectively to the refill and brine valves, yielding means to actuate said valve members, diaphragms associated with said valve members adapted to be actuated by the hydrostatic means, a passageway for hydrostatic fluid communicating with said diaphragms, a needle valve interposed between said diaphragms in said passageway, a float and float arm, a bell crank actuated thereby, a link and lever loosely connected thereto adapted to be actuated by said float and float arm when it reaches a predetermined low point, whereby the needle valve connected to said lever is actuated, and a reciprocating locking plunger adapted to engage with said refill valve, yielding means to move it in one direction and pivotal means connected to said bell crank to move it in the other direction, whereby when the float and float arm get to a predetermined point, the lock will be unlocked.

11. In a water softening apparatus, a brine tank, a softening material tank, a unit consisting of a water meter, needle valve and drain valves, a second unit consisting of a household service valve and regenerating valve, an injector mechanism, a third unit consisting of a brine valve, refill valve and a float mechanism, and piping connecting said valves to one another hydrostatically, said valves being operated in one direction by hydrostatic pressure and in the other direction by yielding means.

In testimony whereof, I affix my signature.

CHARLES P. EISENHAUER.